United States Patent [19]

Moss et al.

[11] 4,318,936
[45] Mar. 9, 1982

[54] METHOD OF MAKING STRAIN SENSOR IN FRAGILE WEB

[75] Inventors: David E. Moss; Karl E. Stone; Charles A. Bright, Jr.; Randy A. Rusch, all of Kokomo, Ind.

[73] Assignee: General Motors Corporation, Detroit, Mich.

[21] Appl. No.: 227,550

[22] Filed: Jan. 23, 1981

[51] Int. Cl.³ .............................................. C23C 11/08
[52] U.S. Cl. ...................................... 427/38; 156/657; 338/2; 338/4; 357/26; 427/39
[58] Field of Search .......................... 427/38, 39, 43.1; 338/2, 4; 357/26, 54; 156/644, 656, 657

[56] References Cited

U.S. PATENT DOCUMENTS

| | | | |
|---|---|---|---|
| 3,424,661 | 2/1969 | Androshuk et al. | 204/161 |
| 3,475,234 | 10/1969 | Kerwin et al. | 148/183 |
| 3,745,428 | 7/1973 | Misawa et al. | 451/145 T |
| 3,819,431 | 6/1974 | Kurtz et al. | 338/4 |
| 3,858,150 | 12/1974 | Gurtler et al. | 338/2 |
| 4,021,872 | 1/1977 | Khajezadeh | 357/54 |
| 4,097,889 | 6/1978 | Kern et al. | 357/54 |
| 4,134,125 | 1/1979 | Adams et al. | 357/54 |
| 4,256,532 | 3/1981 | Magdo et al. | 156/644 |

OTHER PUBLICATIONS

Rosler "Solid State Technology", (Apr. 1977), pp. 63–70.
Hollahan et al. "Technical Report No. PE–004", pp. 224–234, Sixth International Conference on Chemical Vap. Dep. (Oct. 1977).
Hiraiwa et al. "J. Appl. Phys.", vol. 18 No. 1, pp. 191–192 (1979).

Primary Examiner—John H. Newsome
Attorney, Agent, or Firm—Robert J. Wallace

[57] ABSTRACT

A method of making a strain gauge in a fragile web wherein the improvement resides in making the web after the gauge is substantially completely formed. This reverse sequence is made possible by a unique combination of plasma deposited silicon oxide and plasma deposited silicon nitride on top of the completed device to protect it from attack during silicon substrate etching to form the diaphragm.

3 Claims, No Drawings

METHOD OF MAKING STRAIN SENSOR IN FRAGILE WEB

FIELD OF THE INVENTION

This invention relates to piezoresistive silicon devices and more particularly to an improved method for making pressure sensing devices on fragile silicon diaphragms.

BACKGROUND OF THE INVENTION

Typically, many discrete piezoresistive elements are simultaneously made on a single silicon wafer. The wafer is then subdivided into the discrete devices. One or more resistors are diffused or implanted in each device area. Then, a web or diaphragm is usually provided in the wafer by etching each wafer location where a piezoresistive device is to be completed. Thereafter, metal electrodes are formed on the surface of the diaphragm over the resistors. After metallization, the individual elements are separated from the wafer, usually along with a surrounding thicker rim portion. These elements can then be mounted on appropriate substrates and connected to appropriate circuitry for the sensing application intended.

The webs or diaphragms in the wafer are extremely thin, as for example about 0.001 inch. Since the metallization requires several steps, the wafer is subjected to considerable handling after the webs or diaphragms are formed. As a result of mishandling, the webs or diaphragms can break, producing a lower yield in satisfactory discrete elements obtained from the wafer.

In view of the foregoing, it would be better to complete the devices first and then form the webs or diaphragms. However, heretofore the completed devices could not be satisfactorily masked while the wafer backside was being etched. Apparently, metallization steps, and perhaps oxide steps, could not be satisfactorily covered with reasonable thicknesses of a maskant. The maskant typically is silicon nitride, and must be stripped before the device can be used. Hence, thick coatings of it are not desirable. Techniques have been proposed for smoothing out sharp contours on a surface prior to application of a silicon nitride coating. However, they require several layers, thick underlayers, etc., and are therefore not especially desirable. We have found a way to provide a particularly effective yet readily strippable silicon nitride masking layer without resorting to complex or expensive surface treatments or coatings. It is effective enough to permit complete formation of the semiconductive device, including metallization, on the wafer front side, and then etching of the wafer backside. Yet the maskant is readily strippable.

It is hypothesized that enhanced etchant attack of the plasma nitride at the metal steps is due to internal stresses developed in the masking film in conforming to the contour of the steps. Therefore, it is the belief of the inventors that the role of the plasma oxide is one of stress relief. This belief is supported by three pieces of experimental evidence. First, plasma oxide does not tend to smooth or round the contour of the step; rather, it tends to replicate the step. Second, plasma oxide is not an effective barrier to the particular etchant used. Its etch rate in the cavity etch solution is four times that of plasma nitride. Third, stress measurements on bare silicon wafers suggest that plasma oxide has a low Young's modulus (i.e., is compliant). It is instructive to note in this connection that, while a 10,000–15,000 Å layer of plasma nitride alone cannot effectively halt etching at the metal steps, simply inserting a 2000 Å layer of plasma oxide under the same thickness plasma nitride does effect good masking at the metal steps.

OBJECTS AND SUMMARY OF THE INVENTION

It is an object of this invention to provide a process for making strain gauges, pressure sensors or the like with improved yields.

Other objects, features and advantages of this invention will become more apparent from the following specific description of this invention.

The invention comprehends completely forming a piezoresistive device on one major surface of a silicon wafer, with the device including metal electrodes. A thin layer of silicon oxide is then plasma deposited onto the wafer, over the device and electrodes. A somewhat thicker layer of silicon nitride is then plasma deposited over the silicon oxide layer. The backside of the wafer is then etched to form a thin web or diaphragm beneath each device. The silicon nitride and silicon oxide layers can then be stripped from the wafer, or at least from the bonding areas of the electrodes, to make appropriate electrical connections.

DESCRIPTION OF THE PREFERRED EMBODIMENTS

This invention can be used to make beam-type strain gauge elements having a thin web portion suspended between two thicker ends. However, we are most concerned with its use to form generally rectangular diaphragms for a piezoresistive pressure sensing element. Accordingly, the following specific example will be directed to a method of making a pressure sensing element. Nonetheless, it should be understood that our invention can be used to form a reduced thickness for any type of semiconductive element and for other shapes, such as circular.

Our invention can be used to form a pressure sensing element having a generally rectangular thin diaphragm surrounded by a thickened rim. Such an element can be specifically formed in an N-type wafer three inches in diameter and 0.015 inch thick. However, if a four inch wafer is used, we prefer to use a wafer thickness of about 0.20 inch. Wafer resistivity would be dependent upon a variety of factors, including whether one would be using an epitaxial layer on the wafer or not. In some instances, one may prefer to use a lower wafer resistivity to obtain an enhanced etching rate for the wafer backside, and an epitaxial layer on the wafer front side for improved sensing device performance. By wafer front side, we mean that major surface of the wafer on which the piezoresistive, i.e. sensing, devices are formed. By wafer backside, we mean the opposite major surface of the wafer.

In order to prepare the wafer for use in this invention, it is cleaned on both surfaces in any of the normal and accepted manners. The resistors can be formed by diffusion or ion implantation, as is desired. They can be located to be completely within the periphery of the subsequently formed diaphragm and centrally located thereon, or they may be located to be adjacent or overlap an edge on the subsequently formed diaphragm. Analogously, the resistors can assume any of the many configurations and orientations that may be desired for the particular sensing application that is intended. In any event, the wafer is then subjected to a plurality of steps necessary to produce the resistors, which are P-type conductivity elongated island-like regions of appropriate location, configuration and orientation over the silicon nitride holes. The resistors are, of course, produced on the wafer front side, and the silicon nitride holes are on the wafer backside. Many steps, such as oxidation, coating with resist, exposing resist, developing resist, etching oxide, stripping resist, diffusing impurity, and opening contact windows or stripping oxide are required to form the resistors.

The wafer is then completely covered with a blanket coating of silicon nitride at least about 1000, and preferably about 2000 Å thick. We prefer to produce this silicon nitride coating by low pressure chemical vapor deposition, such as is disclosed by R. S. Rosler in "Low Pressure CVD Production Process for Poly, Nitride, and Oxide" in *Solid State Technology*, April 1977 pages 63–70. By way of example, the silicon nitride can be deposited at low pressure by chemical vapor deposition in a furnace tube through which flows a mixture of dichlorosilane and ammonia, at 22 and 164 standard cubic centimeters per minute, respectively. The furnace tube is concurrently maintained at a pressure of about 0.4 Torr and a temperature of about 800° C. In about 30 minutes approximately 1500 Å of silicon nitride will be deposited.

Both faces of the wafer are then coated with a negative or positive photoresist. The surface of the wafer eventually to become the wafer backside is exposed and developed to define an array of rectangular photoresist holes arranged in rows and columns. The holes are of appropriate dimensions for subsequently etching rectangular recesses in the wafer backside. The silicon nitride on the front side of the wafer is left completely unprotected. All of the silicon nitride on the wafer front side, and the silicon nitride exposed within the photoresist holes on the wafer backside is then completely etched away. Any convenient etchant, as for example phosphoric acid or a halogen containing plasma can be used to etch the silicon nitride. This leaves silicon nitride on only the wafer backside, and rectangular holes in it where the backside silicon surface is exposed. The photoresist is then stripped from over the backside silicon nitride.

A metal contact is then formed on the wafer front side for each end of the elongated island-like resistor regions. The contacts are generally formed by evaporating a blanket layer of a metal such as gold, aluminum or the like onto the wafer front side. The metal layer has a thickness of about 10,000–15,000 Å. The metal layer is then photolithographically etched to define discrete contacts, and the photoresist etch mask is removed. In many instances one may choose to include an enlargement on each contact, where filamentary metal wires can be ultrasonically bonded. The island-like resistors and the metal contacts both require numerous photolithographic steps. This entails considerable handling of the wafer. However, since no diaphragms have yet been formed in the wafer, the considerable handling cannot produce any diaphragm breakage.

After the metal contacts have been formed, the wafer front face is then covered. It is first coated with a plasma deposited silicon oxide blanket layer about 2000–4000 angstroms thick. By plasma deposited, we mean plasma enhanced chemical vapor deposition, such as is disclosed in U.S. Pat. No. 3,287,243 Ligenza and U.S. Pat. No. 3,424,661 Androshuk et al, or in "Plasma-Enhanced Chemical Vapor Deposition of Thin Films and Some of Their Etching Characteristics," which was presented by J. R. Hollahan et al at the Sixth International Conference on Chemical Vapor Deposition, October, 1977, Atlanta, Ga. The plasma deposited silicon oxide appears to provide a compliant and conformal coating. Details of the plasma deposition do not appear to be material to this invention. Any of the known and accepted plasma deposition methods and reactors can apparently be used. We prefer to use an Applied Materials, Inc. radial flow reactor AMP 3300 available reactor, a substrate temperature of about 300° C., and an RF power of about 300 watts. In such an apparatus, the silicon slices are radially arrayed on a circular susceptor plate, with their backsides against the plate. Thus, the wafer backsides are masked against deposition. Silane is flowed through a central aperture in the susceptor plate at a rate of about 75 standard cubic centimeters per minute along with about 1488 standard cubic centimeters per minute of nitrous oxide, while maintaining a reactor pressure of about 0.3 Torr. Under the foregoing conditions, deposition of about 2500 angstroms of silicon oxide is produced in about four minutes. The deposition conditions can be varied. However, the deposition should be conducted at a temperature low enough so as not to be detrimental to the metal contacts which have previously been formed on the wafer front face. In general, a deposition temperature of approximately 300° C. is adequate for gold or aluminum contacts. However, if desired for aluminum contacts, the deposition temperature could be conveniently raised to about 500° C. However, temperatures above 577° C., the aluminum-silicon eutectic temperature, should be avoided. For gold metallizations, temperatures higher than about 370° C., the gold-silicon eutectic temperature, should be avoided.

The wafer can then be placed in a similar planar radial flow reactor, for plasma enhanced chemical vapor deposition of silicon nitride. We prefer to plasma deposit a blanket coating of silicon nitride in the same reactor as used for the silicon oxide plasma deposition. The plasma deposition of silicon nitride is performed at a RF power of approximately 500 watts, using a flowing gas mixture of 150 standard cubic centimeters per minute silane, 350 standard cubic centimeters per minute ammonia and 650 standard cubic centimeters per minute nitrogen, at a pressure of about 0.3 Torr and a substrate temperature of about 300° C. As during the silicon oxide deposition, the wafer backside is masked by the susceptor plate. Hence, it need not be otherwise masked to prevent silicon nitride deposition thereon. At least 10,000 angstroms of plasma deposited silicon nitride appear necessary to insure best results. On the other hand, more than about 12,000–15,000 angstroms do not appear to provide any significantly better protection. Such thicknesses are deposited under the foregoing conditions in about 10–15 minutes. After the blanket coatings of silicon oxide and silicon nitride have been successively deposited, the wafer is then ready for backside etching.

The wafer can be prepared for backside etching by first washing it in buffered hydrofluoric acid. Etching of the wafer backside removes silicon exposed within the previously defined rectangular holes in the initially deposited backside silicon nitride layer. The etching is conducted for a sufficient duration to etch almost, but not quite, completely through the silicon wafer exposed within each hole in the backside silicon nitride layer. In other words, a recess is etched within each backside silicon nitride hole. Etching is stopped when a wafer thickness of approximately 0.001 inch remains in the holes, adjacent the wafer front side. This 0.001 inch remaining wafer thickness provides a thin and more strain responsive web or diaphragm under each resistor or discrete resistor group on the wafer front side. For a four inch wafer having a 0.020 inch thickness, one must etch 19 mils into the wafer backside. For a three inch wafer having a 0.015 inch thickness, one must etch 14 mils into the wafer backside. Etching can be conducted using a sodium hydroxide modified etchant, or an etchant consisting essentially of, by weight, 7½% pyrogallo, 16% pyrocatechol, 38½% ethylenediamine, and 38% deionized water. The latter etchant is used at its boiling point, which is approximately 105° C. Such an etchant is extremely caustic, and attacks the silicon at a rate of approximately 4.0 mils per hour. Accordingly, a three or four inch wafer would be exposed to the etchant for about 3-5 hours. The front side silicon nitride, covering the previously finished resistors, is obviously also exposed to the same etchant for the same period of time. The backside silicon nitride is also subjected to the etchant during this period but poses no appreciable problem. It is on a planar surface and is a dense coating produced by low pressure chemical vapor deposition.

The front side silicon nitride coating is not as inert as the backside silicon nitride coating. Nonetheless it is generally not penetrated by the etchant while the wafer backside is being etched. We use the expression penetration because it is to be understood that neither silicon nitride coating is completely inert to the etchant. Their major surfaces merely etch at a substantially slower rate than silicon. Moreover, the low pressure chemical vapor deposited silicon nitride etches about four times more slowly than the plasma deposited silicon nitride and appears to have fewer imperfections where etching occurs more rapidly than on the balance of the coating. Plasma deposited silicon nitride exhibits many such imperfections when deposited directly over a metallization on a semiconductor surface. While reasonable thicknesses of plasma deposited silicon nitride adequately mask planar surfaces, even plasma deposited silicon nitride coatings 10,000–15,000 Å thick do not provide adequate protection against penetration by the etchant at the corners of metal steps when etching silicon to form deep recesses of 0.01–0.02 inch. However, with only about 2000–4000 Å of plasma deposited silicon oxide beneath it, the same thickness (i.e. 10,000–15,000 Å) of plasma deposited silicon nitride resists such penetration. Penetration is not necessarily always completely eliminated, since the coating could contain imperfections where more rapid etching could occur. However, the number of devices ruined by such penetration of our front side silicon nitride maskant is far less than the number of diaphragms previously broken during metallizing in accordance with the prior process. In other words, our masking system is so effective it permits a change in processing that provides higher yields. The yield increase is more than sufficient to offset the increase in processing steps required to apply the plasma deposited silicon oxide and plasma deposited silicon nitride blanket coatings.

After the wafer backside has been etched, the wafer is rinsed in deionized water and dried. As soon as the wafer is stripped of its silicon nitride coatings on the front and backside, and the plasma deposited silicon oxide overlying the metallization, it is ready for dicing. If the resultant device can tolerate it, these coatings need not be stripped off. The silicon nitride coatings can be stripped by immersion of the wafer in hot phosphoric acid or by plasma etching in freon containing 4% oxygen. The plasma deposited silicon oxide can be removed by rinsing the wafer with buffered hydrofluoric acid. In the alternative, any other means for stripping the silicon oxide without attacking the metallization can be used. The wafer can then be diced in the usual manner to release the individual diaphragms that have been formed. For example, the wafer can be scribed between the rows and columns of the diaphragm array. When broken from the wafer, each die has a rim portion of original wafer thickness completely surrounding a diaphragm.

It is not necessary in this invention to deposit the backside silicon nitride layer by low pressure chemical vapor deposition before resistor formation. It is merely preferred to do so. It is possible to plasma deposit the backside silicon nitride in a separate procedure after the wafer front side has been completed, and even blanket coated with the plasma deposited silicon oxide and silicon nitride. However, the backside silicon nitride thickness would have to be increased from about 2000–4000 angstroms to about 10,000–15,000 angstroms, as is used on the wafer front surface. This increase in thickness is required because the plasma deposited silicon nitride etches about four times more rapidly than low pressure chemical vapor deposited silicon nitride.

We prefer to use at least about 10,000 angstroms of plasma deposited silicon nitride, to include a safety margin during etching. Only about 3000–4000 angstroms of the plasma deposited silicon nitride will be uniformly removed during etching of the wafer backside. However, etch pits can develop due to coating defects. With a thickness of about 10,000 angstroms, not more than about 2% of the devices will degrade due to etch pit defects. This can be reduced by about 1% with plasma deposited silicon nitride coatings of about 15,000 angstroms in thickness. However, increases in the plasma deposited silicon nitride thickness above about 15,000 angstroms do not appear to reduce the defects any further. Moreover, when the silicon nitride coating is approximately 30,000 angstroms thick, warping of the wafer may occur. Still further, one should appreciate that the greater the thickness of silicon nitride used, the more that must be eventually stripped away. This is also true of the plasma deposited silicon oxide coating. Hence, we prefer to use as thin a coating as is practicable for the thickness of the resistor contacts that is used.

As previously indicated only a minimal thickness of the plasma deposited silicon oxide is necessary to increase the resistance of the plasma silicon nitride layer to attack during silicon wafer etching. We know that approximately 2000–4000 angstroms is sufficient to produce the improvement. Only about 1000–1500 angstroms may produce an adequate benefit for thinner metallizations, such as only about 10,000 angstroms thick. However, we have found that about 2000 angstroms of plasma deposited silicon oxide consistently reduces the defect density down to about 2% or lower on contact thicknesses of about 12,000 angstroms. It can be reduced down to about 1% with a silicon oxide thickness of 4000 angstroms. However, increased thicknesses of the silicon oxide do not appear to provide any enhanced benefits. We prefer to avoid them since they add to deposition and stripping costs.

However, in the event wafer thicknesses greater than about 0.02 inch are to be processed, it may be desired to somewhat increase not only the plasma deposited silicon oxide but also the plasma deposited silicon nitride thickness beyond what is stated above. Analogously, if metallization layers over about 15,000 angstroms thick are to be used for the resistor contacts, we may prefer to increase the plasma deposited silicon oxide and/or the plasma deposited silicon nitride thickness over that hereinbefore mentioned.

The embodiments of the invention in which an exclusive property or privilege is claimed are defined as follows:

1. In a method of making a strain sensing semiconductive device in a fragile silicon web, an improvement for reducing diaphragm breakage that comprises forming an operative device on one major surface of a silicon wafer portion before diaphragm formation, plasma depositing a blanket coating of silicon oxide onto said surface and device effective to allow deposition of a more etch-resistant silicon nitride coating, plasma depositing a first blanket coating of silicon nitride onto said silicon oxide coating to mask it from corrosive etchants, said silicon nitride coating providing an effective maskant even over a metal pattern on said surface portion, providing a silicon nitride blanket coating on the opposite wafer surface with an opening therein corresponding to the fragile web desired for said device, and etching said opposite silicon surface through said opening to form the web without deleteriously affecting the device, whereupon an operative device formed in a fragile diaphragm is produced and web breakage during device formation is avoided.

2. In a method of making a strain sensing semiconductive device in a thin silicon diaphragm subject to breakage due to handling, the improvement of providing one major surface of a silicon wafer portion with a silicon nitride masking coating that defines a wafer area to be etched for diaphragm formation, forming an operative device on the opposite major wafer surface over said diaphragm area before forming the diaphragm, plasma depositing a blanket coating about 0.2–0.4 micrometer thick of silicon oxide onto said surface over said operative device to enhance etchant protection of said device, plasma depositing a blanket coating about 1–2.0 micrometers thick of silicon nitride onto said silicon oxide to mask even a metal pattern on said surface from corrosion by a silicon etchant, said plasma depositions being conducted at a temperature below that which is detrimental to said metal pattern, etching said one major surface through said masking coating to form a thin integral diaphragm under said device, and stripping said coatings to reveal the operative device for terminal lead connection, whereby diaphragm breakage can be reduced by forming the diaphragm after the device is formed.

3. In a method of making semiconductive pressure transducer elements comprising strain sensing semiconductive devices integrally formed on fragile silicon diaphragms, the improvement of forming substantially complete devices on one major surface of a silicon wafer before the diaphragms are formed in it, said devices including metal contacts, depositing a masking coating about 0.2–0.4 micrometer thick of silicon oxide on said surface over said devices for enhancing etch resistance of a subsequently deposited silicon nitride coating over edges of said metal contacts, depositing a masking coating about 1–2 micrometers thick of silicon nitride on said silicon oxide coating to protect the devices during subsequent wafer etching, forming on the opposite major wafer surface a second silicon nitride masking coating about 1–2 micrometers thick that has apertures therein opposite said devices, each of said coatings being applied by plasma enhanced chemical vapor deposition at a temperature not detrimental to the metal contacts, etching the opposite wafer surface exposed in said apertures to form thin silicon diaphragms under said devices, and stripping said coatings to reveal the previously formed substantially complete devices, whereby the wafer is subjected to less handling after diaphragm formation and yields of acceptable transducers are increased.

* * * * *